United States Patent [19]

Ivie et al.

[11] Patent Number: 5,420,981
[45] Date of Patent: May 30, 1995

[54] ARRANGEMENT FOR ESTABLISHING A DATA PIPELINE IN A DATA PROCESSING SYSTEM EMPLOYING MULTIPLE PROCESSORS

[75] Inventors: Mark E. Ivie, Port Monmouth; John C. Schwebel, Leonardo, both of N.J.

[73] Assignee: AT&T Corp., Murray Hill, N.J.

[21] Appl. No.: 989,994

[22] Filed: Dec. 10, 1992

Related U.S. Application Data

[63] Continuation of Ser. No. 414,871, Sep. 29, 1989, abandoned.

[51] Int. Cl.⁶ .................................................. G06F 13/00
[52] U.S. Cl. ............................. 395/200; 364/DIG. 1; 364/222.3; 364/262.4; 364/284.4
[58] Field of Search .......... 395/200, DIG. 1, DIG. 2, 395/284.3, 284.4, 262.4

[56] References Cited

U.S. PATENT DOCUMENTS

| | | | |
|---|---|---|---|
| 3,798,613 | 3/1974 | Edstrom et al. | 340/172.5 |
| 3,962,685 | 6/1976 | Isle | 340/172.5 |
| 4,020,469 | 4/1977 | Manning | 340/172.5 |
| 4,543,626 | 9/1985 | Bean et al. | 364/200 |
| 4,620,279 | 10/1986 | Read et al. | 364/200 |
| 4,754,395 | 6/1988 | Weisshaar et al. | 364/200 |
| 4,901,232 | 2/1990 | Harrington et al. | 364/200 |

FOREIGN PATENT DOCUMENTS 2181870 4/1987 United Kingdom ......... G06F 11/20

*Primary Examiner*—Kevin A. Kriess
*Assistant Examiner*—Kakali Chaki
*Attorney, Agent, or Firm*—Frederick B. Luludis

[57] ABSTRACT

A data processing system having the capability to store data is provided with a facility to dynamically establish a data pipeline extending from a source of the data to an intended recipient. The operation of the data pipeline facility is typically initiated in response to a user entering a request for particular data. Specifically, upon receipt of the user request, a chain of commands is dynamically constructed, in which each command is operative for forming a respective leg of the data pipeline and for invoking the next, adjacent command in the chain. In the instance where the desired data comprises a plurality of fragments, the commands then maintain the pipeline until the last of such fragments has been obtained from the source. Thereafter, each command terminates its respective leg of the pipeline after passing the last fragment of data to the next command in the chain.

11 Claims, 12 Drawing Sheets

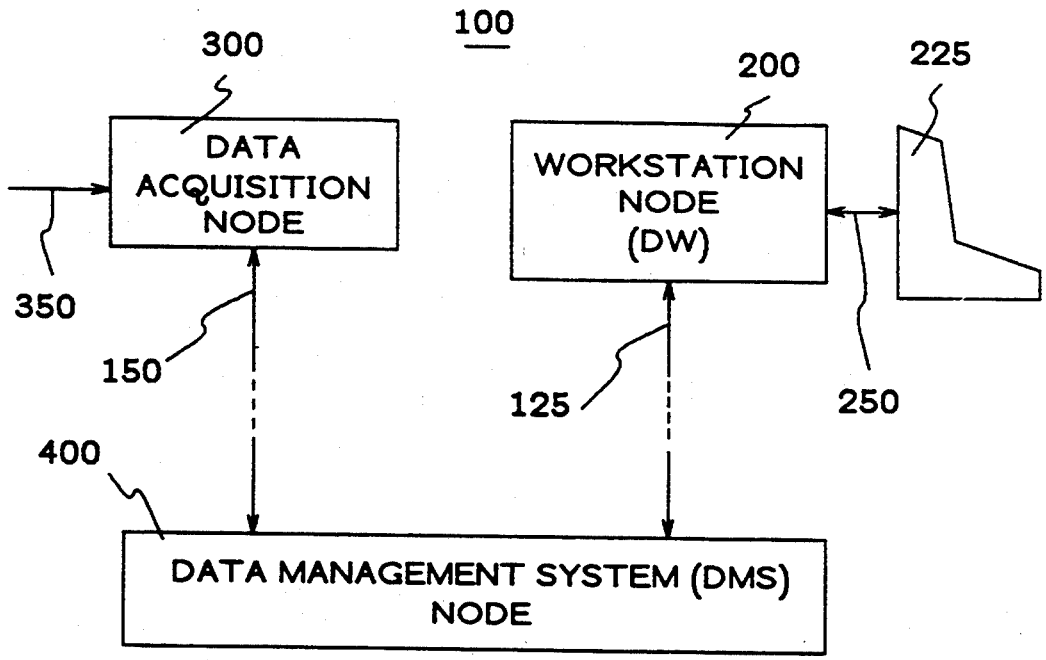

FIG. 3

COMMAND CHAIN

| | | |
|---|---|---|
| a { | HEADER | |
| | COMMAND - 1 | OPTIONS | ARGMENTS |
| b { | ○<br>○<br>○<br>○<br>○ | ○<br>○<br>○<br>○<br>○ | ○<br>○<br>○<br>○<br>○ |
| | COMMAND - N | OPTIONS | ARGUMENTS |
| c { | ARGUMENT<br>ARG 1<br>○<br>○<br>○<br>○<br>ARG M | TYPE<br>a<br>○<br>○<br>○<br>○<br>m | |

FIG.4

TABLE 2

| COMMAND OPTIONS ||
|---|---|
| OPTION | MEANING |
| -F | DO COMMAND ONLY IF FIRST FRAGMENT |
| -L | DO COMMAND ONLY IF LAST FRAGMENT |
| -A | DO COMMAND FOR ALL FRAGMENTS |
| -R | RELEASE INPUT WHEN DONE (FREE DAM) |
| -E | DO COMMAND ONLY IF ERROR STATUS |
| -M | GENERATE MULTIPLE OUTPUTS IF NEEDED |
| -S | GENERATE SINGLE OUTPUT ONLY |

| COMMAND ARGUMENT OPTIONS ||
|---|---|
| OPTION | MEANING |
| -i | INPUT |
| -o | OUTPUT |
| -s | SOURCE |
| -t | TARGET |

FIG.5

COMMAND CHAIN

| COMMAND | OPTIONS | ARGUMENTS | |
|---|---|---|---|
| TS_SEND | -F | -sDMS,-tDC | 501 |
| TS_RECV | | | 502 |
| TS_IMREAD | -A,-M | %1, -0 %2 | 503 |
| TS_SEND | -A,-R | -I %2, -sDC, -tDMS | 504 |
| TS_RECV | -A,-R | -0 %3 | 505 |
| TS_DECOMPRESS | -A,R | -I %3, -0 %4, %5 | 506 |
| TS_ASYNC_REPLY | -A | %1, -0 %4 | 507 |
| ARGUMENT | TYPE | | |
| %1 | TS_DMKEY | | 508 |
| %2 | TS_DAM | | 509 |
| %3 | TS_DAM | | 510 |
| %4 | TS_DAM | | 511 |
| %5 | TS_DOPT | | 512 |

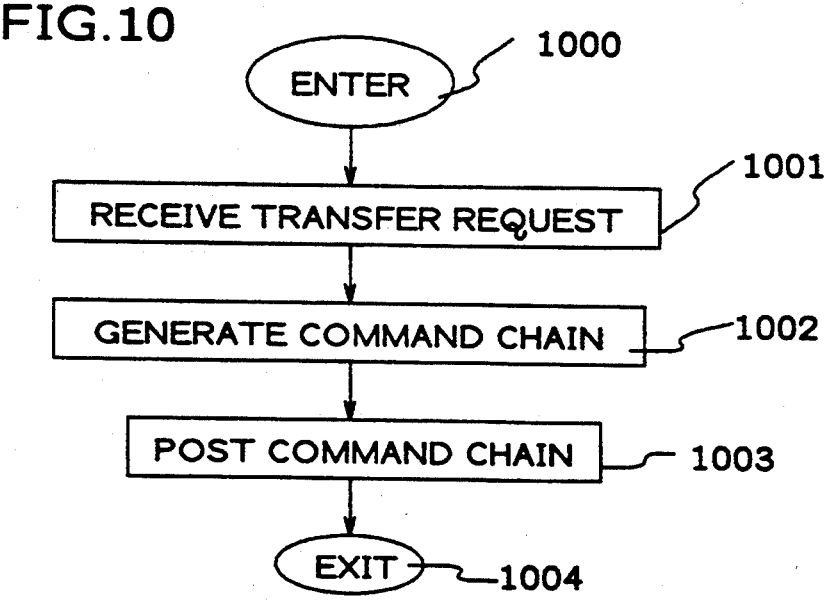
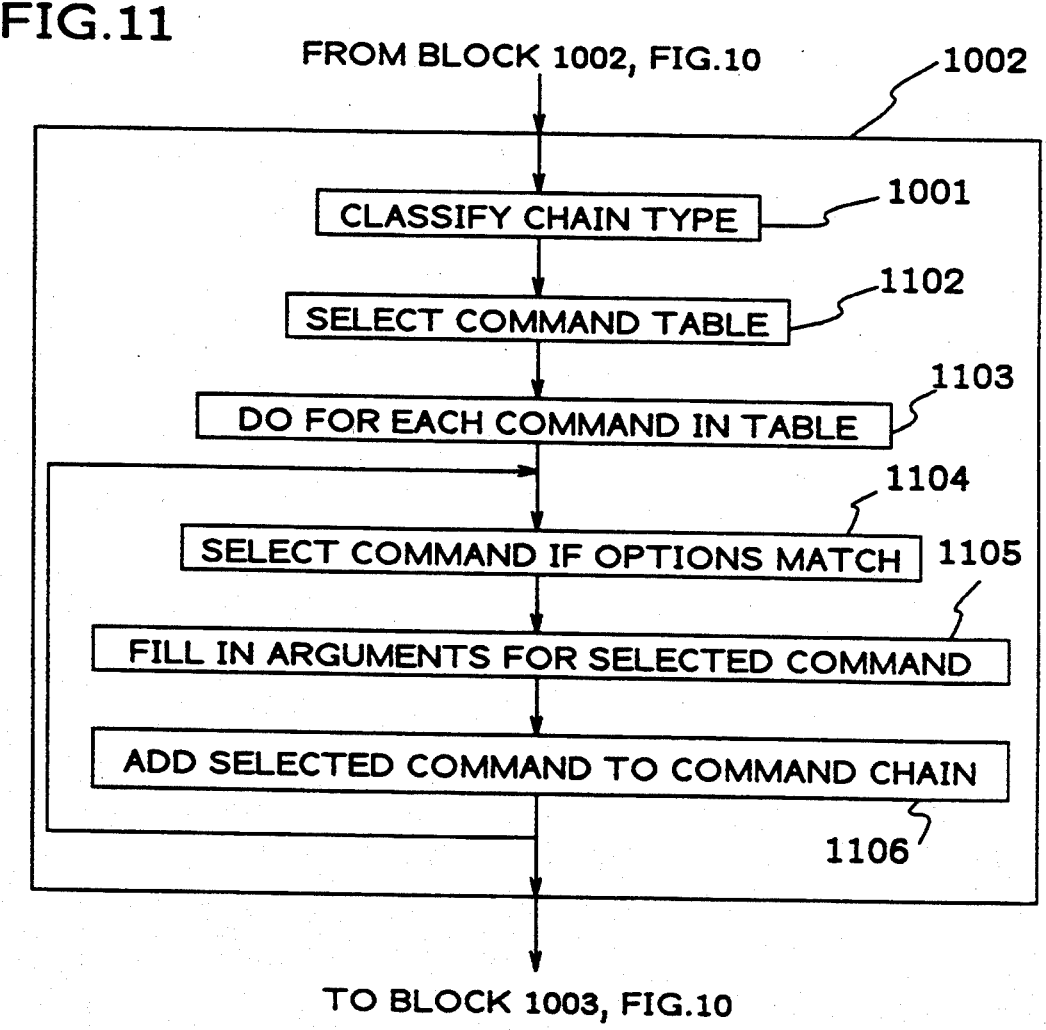

ARRANGEMENT FOR ESTABLISHING A DATA PIPELINE IN A DATA PROCESSING SYSTEM EMPLOYING MULTIPLE PROCESSORS

This application is a continuation of application Ser. No. 07/414,871, filed on Sep. 29, 1989, now abandoned.

FIELD OF THE INVENTION

The invention relates generally to the field of distributed processor systems and more particularly to arrangements which establish a data pipeline among processes.

BACKGROUND OF THE INVENTION

In a data processing and management system having a distributed processor configuration, data requested by a user is acquired from memory by establishing a pipeline between a process managing the memory and a receiving process. (Typically, a receiving process may be one of a number of so-called I/O processes designed, for example, to display data on a display or to output data to a printer.)

A pipeline to acquire data is typically established using a series of commands executed by a central control program (taskmaster). The commands are executed in the order that they are contained in the series. The execution of a command means that the taskmaster invokes a program (process) identified by the command. The program then performs its intended function, such as, for example, retrieving the data from memory or decompressing (expanding) the unloaded data. When a program completes its intended function, it then notifies the taskmaster of that fact in a conventional manner, e.g., by generating a so-called interrupt. The taskmaster then interrogates a status word associated with the program to determine whether the program successfully executed its intended function. If the status word indicates that is the case, then the taskmaster executes the next command in the series. Otherwise, the taskmaster executes a so-called error handling (diagnostic) program to hopefully determine the reason for the failure.

It can be appreciated that using a taskmaster (control program) to invoke and oversee the operation of each command in a series of commands is inefficient from the standpoint that it consumes real time. In addition, in the event that the demands on the taskmaster increase, then the taskmaster could become overloaded, thereby slowing down the establishment of the pipeline.

Moreover, in the event that the desired data is stored in memory as large blocks (fragments) of data, as would be the case where the data represents, for example, one or more high resolution images, then the taskmaster would have to repeat the execution of the series of commands to obtain each such fragment. Alternatively, the series of command could be constructed such that certain commands are repeated and, therefore, are executed more than once. It can be appreciated, however, that if the data comprises an appreciable number of fragments, then the series would contain a similar number of commands, thereby making the execution of the series unwieldy.

One way to handle this problem is to design a user interface process that would perform each function that is performed by the series of commands. In this sense, then, only one process would be invoked to establish the pipeline and obtain the data for display. However, such an interface process would be complex and large. A program that is complex and large is extremely difficult to modify to incorporate new features. Moreover, once such a program has been so modified it is extremely difficult to debug.

SUMMARY OF THE INVENTION

The problems associated with prior arrangements designed to establish a data pipeline are obviated by maintaining the modularity of the processes involved in establishing a data pipeline so that they may easily be modified and by eliminating the need for a taskmaster. Thus, in our arrangement the commands and their associated processes form a pipeline themselves without the intervention of a taskmaster. In particular, a chain of commands is formed responsive to a user request, in which the commands and associated processes are designed to establish respective legs of the pipeline and are further designed to invoke one another. Thus, when a command completes its intended function, it goes on to invoke the next command in the chain. That is, a command is invoked when it reaches the top of the chain.

In addition, the processes associated with the commands that establish the pipeline maintain the pipeline for each fragment of multifragment data, thereby eliminating the need to repeat commands in the chain.

BRIEF DESCRIPTION OF THE DRAWINGS

FIG. 1 shows a broad block diagram of a distributed processor system in which the invention may be practiced and in which the processors are located at respective sites;

FIG. 2 shows a table of processes and respective services (commands) that may be invoked to establish a data pipeline in accordance with the principles of the invention;

FIG. 3 shows in generalized form an example of a chain of commands that may be used in an illustrative embodiment of the invention to establish a data pipeline;

FIG. 4 shows an example of a table of options and arguments that may employed in one or more of the commands shown in FIG. 3;

FIG. 5 shows an example of a command chain employing a number of the commands, options and arguments illustrated in FIGS. 2 and 4;

FIGS. 10-15 illustrate flows charts of programs which implement the invention in the system of FIG. 1.

DETAILED DESCRIPTION

Figure 6:
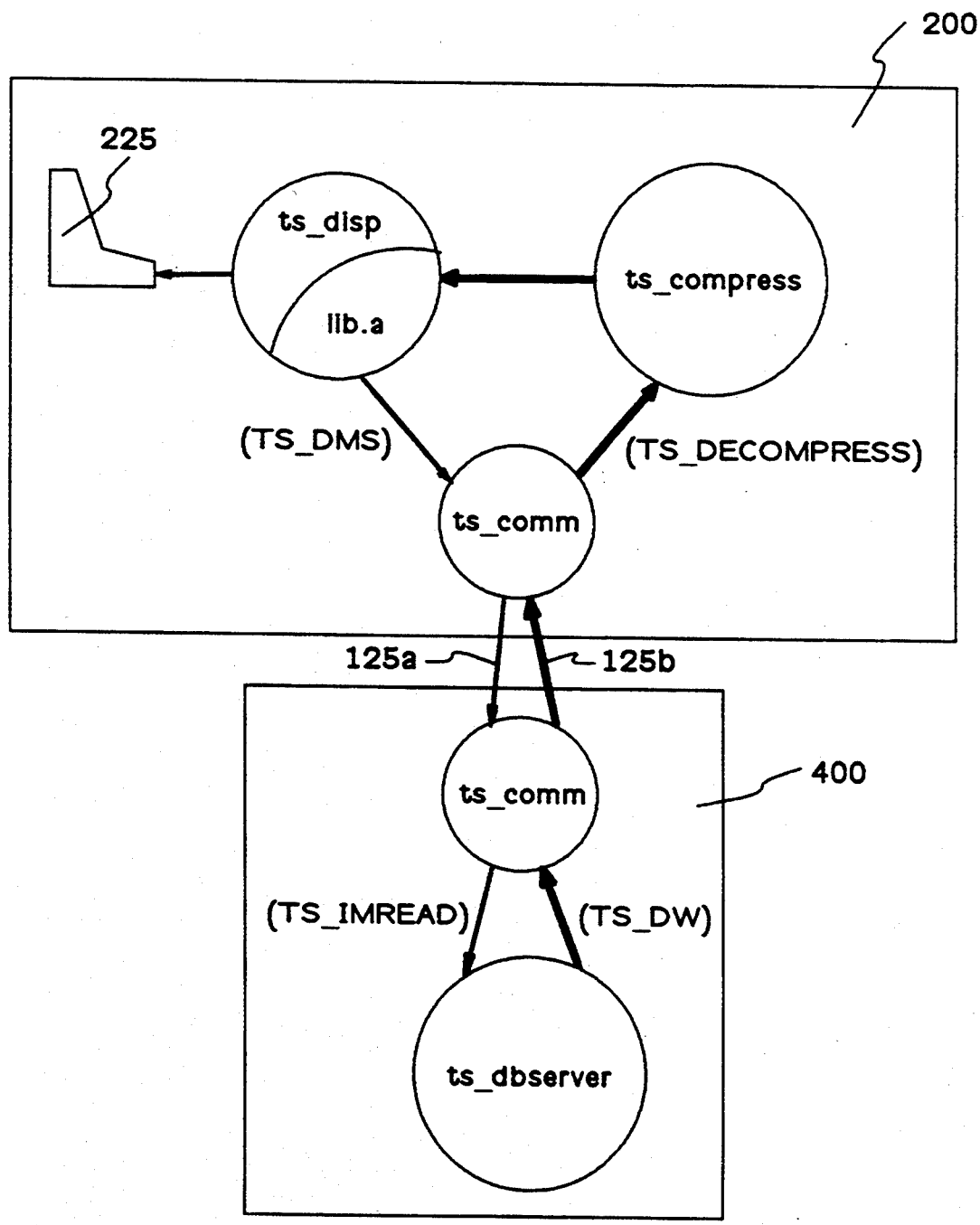
FIG. 6 shows a state diagram useful in understanding the execution of the commands of chain shown in FIG. 5.

FIG. 1 illustrates a broad block diagram of a data acquisition and processing system 100 including, inter alia, workstation node 200, data acquisition node 300 and data base management system 400. Data acquisition node 300 is arranged to acquire data via communication path 350 and to store such data in data management system node 400 (DMS) via communication path 150. Workstation node 200 responsive to a request entered by a user operating display terminal 225 obtains data from DMS 400 via communication path 125 and then passes the data via communication path 250 to terminal 225 for display. Thus, system 100 is a so-called distributed processor system in which each processor (node) performs a respective function. In addition, as will be seen below, each processor itself is a distributed processing system having a number of processors each performing a respective function.

In the practice of the invention, nodes 200, 300 and 400 may be co-located with one another or located at respective sites. In the latter case then, communication paths 125 and 150 may be any suitable data transmission path, such as, for example, the well-known T1 carrier system, or optical fiber, capable of transporting data over an appreciable distance. Communication paths 125 and 150 may also be, for example, respective "dial up" telephone line connections, in which nodes 200, 300 and 400 interface with the telephone line connections via conventional modems.

Specifically, to store data acquired via path 350, a process in node 300 establishes a data pipeline between itself and node 400 and then transmits the data to the latter node for storage therein. Similarly, to acquire specific data from node 400, a process in node 200 establishes a data pipeline between itself and node 400 such that node 400 unloads the data from its memory and passes it via the pipeline to node 200.

As mentioned above, prior arrangements establish a data pipeline using a so-called taskmaster that is arranged to establish communication paths between the processes identified in a so-called predefined shell program. Our arrangement does not employ a taskmaster, since, in accordance with the invention, the processes which form the pipeline dynamically establish and maintain the pipeline themselves.

It can be appreciated that a number of processes each designed to perform a respective function are employed in establishing a pipeline. For example, processes are required to establish the communication path between nodes, while other processes are required to either store data in or read data out of node 400, as shown in FIG. 2.

In particular, Table 1 identifies three processes each capable of performing a number of predetermined functions (commands). The process ts_compress is a so-called compression server capable of either compressing or decompressing data in accordance with one of a number of predefined compression/expansion ratios. The process ts_dbserver is a so-called database server capable of executing an appreciable number of commands, namely, a command which stores text in the database of node 400 (TS_DMADD); commands which modify, read, or delete text stored in the database (TS_DMMOD, TS_DMREAD or TS_DMDELETE, respectively), and commands which add an image to or which read or delete an image from the database (TS_IMADD, TS_IMREAD, TS_IMDELETE, respectively).

The ts_dbserver process also executes two other commands, TS_T_QUEUE and TS_T_DEQUEUE, which are invoked as part of an error handling process to retry a command that fails to perform its intended function.

The process ts_comm is a so-called communications server capable of executing either the command TS_SEND or the command TS_RECV, as discussed below in detail.

In an illustrative embodiment of our invention, a data pipeline is established responsive to receipt of particular stimuli, such as, for example, a request inputted by a user positioned at an input terminal, for example, terminal 225. In particular, responsive to receipt of a request identifying particular data a process is entered which, using attributes contained in the request, generates, in accordance with an aspect of the invention, a chain of commands comprising a number of the commands defined in Table 2. The general form of a command chain is illustrated in FIG. 3.

It is seen from FIG. 3, that a command chain comprises three sections, namely a header "a", command chain "b" and argument definition "c". The header comprises a number of entries defining, inter alia; (a) the identity of the transaction as specified by the time of day that the transaction (command chain) was created plus an assigned identification number, (b) the identity of the originator of the command chain (source) (c) type of transaction, (d) status of the transaction, i.e., success or fail and (e) the identity of the process that is to receive a reply (i.e, success or failure of the transaction). A reply indicative of a successfully executed transaction is typically returned to the source, whereas a failure is returned to a so-called error routine.

Following the header are the commands that invoke the various processes that, in accordance with the invention, dynamically establish and maintain the data pipeline without the intervention of a so-called taskmaster. In particular, an entry in section "b" comprises a number of fields—illustratively three fields—, in which the first field identifies the command, the second field defines one or more associated options, and the third field specifies one or more associated arguments. The last section "c" defines the various arguments that are specified in the preceding section "b". The reason for defining the arguments in this manner will become apparent below.

A command chain is executed by "posting" the first command contained therein to what is commonly referred to in the art as a "bulletin board" service. The bulletin board service, in turn, returns the identity of the process offering the service capable of executing the command as well as the location of the memory queue associated with the identified process. For example, if the command happens to be TS_IMREAD, then the bulletin board service will identify ts_dbserver as the process offering the respective service as well as the location of the associated queue. (The notion of using a bulletin board service is provided by the TUXEDO transaction processing system available from AT&T. The TUXEDO transaction processing system is a Unix system V-based transaction processing system, which handles a large number of user requests for manipulation of information (data) stored in a database of substantial size. The purpose of the system is to provide a software environment for the development and implementation of business-oriented transaction processing applications. The TUXEDO system is disclosed, from a user and software applications standpoint, in literature available from the AT&T Customer Information Center, P.O. Box 19901, Indianapolis, Ind. 46219, in which such literature is incorporated herein by reference.)

Armed with the identity of the process which services the first command in the chain, the posting process stores the command chain in the queue associated with the identified process. The identified process, for example, ts_dbserver, is then notified that a command chain has been stored in its queue. The process, in turn, invokes the service that executes the first command in the chain. It is noted that a command typically comprises (a) a preprocessing routine which establishes certain precondition(s) required by the command being executed, such as defining input and output, as specified by arguments associated with the command; (b) a processing routine which processes the command; and (c) a post processing routine which is more or less a so-called "clean-up" routine. For example, the post processing step, inter alia, (a) releases, for example, the input, as will be discussed below, (b) notes in the status field of command chain header whether its associated command successfully completed its intended function, and (d) modifies the command chain so that the next command in the chain may be executed. That is, the post processing step deletes its associated command from the chain, thereby making the next command the first command in the chain. In addition, the post processing step posts the command that is now first in the chain to the aforementioned bulletin board to obtain the location of the queue of the process that will execute the command that is now first in chain. Once it obtains that information, the post processing step then loads the modified chain of commands in the identified work queue.

Thereafter, the process assigned to that queue unloads the command chain from its queue and invokes the service that will execute the command that is currently first in chain. Similarly, the post processing step of the command being executed modifies the command chain in the manner described above and posts the first command to the bulletin board to identify the process that will service that command. Each of the remaining commands in the chain is thus processed in the described manner such that the commands themselves dynamically establish the data pipeline and maintain its operation in order to transport data from one node to another node.

The various commands that are executed to establish a respective pipeline maintain the operation of the pipeline in accordance with particular options specified in their respective option fields. For example, an option may specify that the associated command is executed for (a) only the first portion, or fragment, of data, (b) only the last fragment of data, or (c) for all fragments of data, as represented by the options illustrated in FIG. 4, namely, options "F", "L" and "A", respectively. An option may also specify that (a) the input is to be released when the command that is being executed completes its function; (b) the command is executed only if an error status occurs; (c) the command is to generate multiple outputs if needed; and (d) the command is to generate a single output only; as represented by options "R", "E", "M" and "S", respectively. FIG. 4 also illustrates a number of so-called argument options (i.e., options "i", "o~", "s" and "t") that may be associated with a command. The manner in which the latter options are used will become apparent below.

With the foregoing in mind we will now discuss an illustrative example of the manner in which a data pipeline is established, in accord with the invention. In the following illustrative example, it will be assumed that a user positioned at terminal 225 desires particular data, for example, data defining respective images, in which the images are stored in DMS 400.

Specifically, a user positioned at display terminal 225 may obtain such data for display on terminal 225 or associated display monitors (not shown in FIG. 1) by entering via the terminal 225 keyboard an appropriate command identifying the data. A display process (ts_disp) operating under the control of the operating system which drives Workstation node 200 responds to the request by first checking to see if the sought-after data is stored locally in memory contained within node 200.

If the data is stored locally, then the node 200 display process establishes a data pipeline between itself and a process which unloads the data from local memory. However, if the data is not stored locally, but is stored in DMS 400, then the node 200 display process, ts_disp, arranges to obtain the desired data from DMS 400.

To obtain data from DMS 400, ts_disp at node 200 calls into play a number of processes which cooperate with one another to establish a data pipeline between nodes 200 and 400 to obtain the identified data. That is, using the single command entered by the user, the node 200 display process, in accordance with an aspect of the invention, dynamically constructs a chain of commands that will invoke one another to establish the desired data pipeline.

The chain of commands is dynamically constructed by selecting from a library of commands (lib.a) appropriate commands and associated options and arguments that will establish the desired data pipeline. In doing so, the ts_disp process considers particular attributes of the request entered by the user, such as, for example, (a) the location of the desired data (local or remote), (b) whether the data is stored in a compressed form, and (c) whether the identified data is text or image(s). In the present illustrative example of the invention, it will be assumed that the desired data is stored in compressed form, thereby causing the chain of commands to invoke a process which will decompress (expand) the data as it moves through the established data pipeline.

(It is noted that in contemplation of the invention, the desired data (images) as identified in the request inputted by the user positioned at terminal 225 could be, for example, a series of high resolution images. In our arrangement, each high resolution image may be divided into a number of fragments so that the image can be efficiently processed and stored in DMS 400. Thus, a data pipeline that is established between DMS 400 and node 200 to acquire such data has to remain open until the last fragment of an image (or of the last image of the series) is received at node 200, as will be shown below.)

Turning then to FIG. 5 there is shown an illustrative example of a command chain constructed in the aforementioned manner to establish a data pipeline between nodes 200 and 400. For the sake of clarity and brevity, the command chain header is not shown in the FIG. A discussion of the way in which the command chain is executed will make reference to both FIGS. 5 and 6. FIG. 6 depicts the sequence of processes that are invoked to establish the data pipeline, as represented by the heavy line interconnecting ones of the processes. It is to be understood of course that, other than the physical connection 125 (communication path) connecting node 200 to node 400, the data pipeline is a logical connection, as will be shown below.

Specifically, once the chain of commands is constructed, the first command, TS_SEND (entry 501), is posted to the aforementioned bulletin board. The bulletin service, in turn, returns to the posting process, ts_disp, the identity of the process which offers the TS_SEND service, which happens to be TS_COMM, as discussed above. Accordingly, ts_disp loads the command chain in the queue assigned to TS_COMM. When TS_COMM unloads the command chain from its queue it invokes the TS_SEND process to execute the first command in accord with the associated options and arguments. The option -F indicates that the associated command will be executed only once, whereas the arguments -s DMS and -t DC note that the source of the data is DMS node 400 and the recipient (target) of the data is workstation node 200.

Responsive to the first argument, TS_SEND (a) establishes a communication path 125a between nodes 200 and 400 and (b) deletes the first command from the chain of commands and sends the result to node 400. It is noted at this point that communication path 125a is established for the sole purpose of transmitting the resulting command chain to node 400. Therefore, upon receipt of the command chain at node 400, the serving process, TS_RECV (entry 502) may relinquish control over communication path 125a. (It is also noted that if communication path 125a is not used within a predetermined period of time following receipt of the command chain at node 400, then the path will time out and be terminated.)

Responsive to receipt of the command chain, TS_RECV (a) deletes its command from the chain, thereby causing the next command, TS_IMREAD (entry 503), to become the first command in the chain, (b) identifies the server that will process that command as a result of posting the command to the aforementioned bulletin board, and (c) loads the command chain in the queue of the identified process server. As discussed above, ts_dbserver includes a service that is designed to execute the TS_IMREAD command.

As mentioned above, a command may contain a preprocessing step which operates to set the stage for the execution of the command. Accordingly, the TS_IMREAD proprocessing step operates on the associated arguments, namely "%1" and "-o %2". It is seen from FIG. 5 that the first argument refers to a key (TS_DM-KEY) which identifies the desired data (images). Therefore, the TS_IMREAD preprocessing step stores the key in memory contained in node 400, the memory being, for example, disk memory, as will be shown below. The second argument, "-o %2" indicates that the unloaded data is to be outputted (o) to a memory DAM (%2). As is well-known in the art, a DAM is a memory buffer that may be shared among a plurality of processes. That is, each of the processes in the command chain may access the memory buffer. The preprocessing step thus causes a predetermined number of node 400 memory locations—illustratively one megabytes of eight bits each byte—to be allocated for use as the DAM, in which the memory in this instance is, for example, random access memory (RAM). The preprocessing step then loads the address in the TS_DAM field of entry 509.

Following the preprocessing step, the main processing step of TS_IMREAD is executed which then unloads the first fragment of the data from the node 400 disk memory and stores the data in the output DAM. It is seen from FIG. 5 that two options are associated with the TS_IMREAD command, namely, the options "A" and "M", which respectively direct that the TS_IMREAD command is to be executed for all fragments of the desired data and that multiple outputs are generated if needed, as discussed above. Thus, TS_IMREAD will continue to run, unloading each fragment of the desired data from the disk and storing it in an output DAM. When each fragment has been so processed, then the post processing step of TS_IMREAD is executed. The post processing step will be generally discussed below.

When the first fragment of the desired data is stored in the output DAM, TS_IMREAD (a) saves a copy of the command chain that it received, and (b) deletes the TS_IMREAD command from the chain and passes the result to TS_SEND (entry 504) contained in node 400 using the aforementioned bulleting board service, thereby establishing the first leg of the data pipeline. Thereafter, TS_IMREAD passes each such fragment to TS_SEND as the fragment is unloaded from memory and stored in an allocated output DAM.

When TS_SEND is executed, it uses as its input the contents of the output DAM that has been allocated by TS_IMREAD, as directed by the "-i %2" argument associated with the TS_SEND command. Similarly, the function of TS_SEND is to establish in a conventional manner a communication path between node 400 and another node. In the present illustrative example, the other node is node 200 as identified by the argument "s DC" that is associated with the TS_SEND command. When TS_SEND establishes communication path 125b between nodes 400 and 200, TS_SEND then sends to TS_RECV at node 200 a copy of the command chain modified so that the TS_RECV command (entry 505) is first command in the chain. TS_SEND then transmits to TS_RECV of node 200 the contents of the DAM identified by the associated "-i %2" argument.

It is seen from FIG. 5, that, options "A" and "R" associated with the TS_SEND command at node 400, direct TS_SEND to perform its function for all of the fragments of the desired data that it receives and release control of the input DAM following the sending of a fragment to TS_RECV at node 200, respectively. (It is understood of course that TS_SEND releases the DAM and that TS_IMREAD may store the next fragment that it unloads from memory in another allocated DAM.)

TS_RECV at node 200 responsive to receipt of the command chain allocates a node 200 memory DAM for use as an output buffer as directed by the argument "-o %3" associated therewith and as defined at entry 510. TS_RECV then stores the address of the DAM in the TS_DAM field of entry 510. In the present illustrative example of the invention, the DAM may be, for example, RAM, which is contained in node 200 and which comprises—illustratively one megabytes of memory with each byte comprising eight bits.

Similarly, when TS_RECV receives a fragment of the desired data and has stored the fragment in the allocated output DAM, then TS_RECV employs the aforementioned bulletin board service to pass to the service serving the next command in the chain, TS_DECOMPRESS (entry 506), a copy of the command chain modified in the manner described above. As discussed above, the ts_compress process services the TS_DECOMPRESS command. (It is noted that a result of the "A" option associated with the TS_SEND and TS_RECV commands (entries 504 and 505, respectively), TS_SEND and TS_RECV continue to perform their intended functions for all fragments of the desired data.)

When TS_DECOMPRESS is executed as a result of the foregoing actions, its preprocessing step operates on the first argument, "-i %3", associated therewith. Upon checking the "type" field of entry 510 of the command chain, the preprocessing step will find that the input DAM called for by that argument has been allocated, and, therefore, takes no action vis-a-vis allocating an input DAM. The preprocessing step then goes on to operate on the second argument (-o %4) associated with TS_COMPRESS command. However, upon checking the "type" field of entry 511 of the command chain, the preprocessing step will find that the TS_DECOMPRESS command has not yet been allocated an output DAM. Accordingly, the preprocessing step operates in this instance to allocate a node 200 memory buffer for use as the output DAM. Similarly, the output DAM may be, for example, RAM comprising—illustratively one megabytes of memory with each byte having eight bits.

Thereafter, the main processing step of the TS_DECOMPRESS command assumes control and operates to the decompress (expand) the data bytes contained in the input DAM identified by the argument "-i %3". The command TS_DECOMPRESS expands the data in accord with one of a number of different decompression parameters, such as, for example, a parameter specifying a spatial reduction factor of 2:1. The parameters are stored in the type field of entry 512 of the command chain, and the resulting expanded data is stored in the output DAM identified by the associated argument "-o %4". Similarly, the TS_DECOMPRESS command continues to perform its intended function for all subsequent fragments of the desired data, as directed by the "A" option specified in entry 506, as will similarly be done by the TS_IMREAD, TS_SEND and TS_RECV commands.

When TS_DECOMPRESS completes its task of expanding the current fragment of input data, its post processing step then marks the status field of the command chain header in accordance with whether or not the input was successfully decompressed and then releases the input DAM as directed by the associated "R" option. It is noted that if the associated command does not successfully complete its intended function, then an error handling routine is entered to retry the command. However, if the retry is not successful, then the error handling routine would make an appropriate notation to that effect in the status field and terminate the transaction by passing the command chain to the source process. If the command is successful, then the transaction continues as intended.

Assuming that all events are successfully completed, then the post processing step causes the next, or last, command in the chain, namely, the TS_ASYNC_REPLY command (entry 507), to be "posted" in the manner described above.

As mentioned above, the command chain header includes a field for entering the identity of the recipient of the data. Typically, the entry identifies the calling, or source process, which in the present example is ts_disp. However, as an aspect of the invention, the field may be used to identify another process. That is, a source process may generate a command chain which establishes a data pipeline such that particular data is delivered to another process identified in the reply field, rather than the source process.

In our arrangement, we use TS_ASYNC_REPLY to return the data to the process identified in the reply field of the command chain header. Specifically, the bulletin board service treats TS_ASYNC_REPLY as being a so-called pseudo command and returns to the TS_DECOMPRESS post processing step the location of the queue of the process identified in the reply field of the command chain header. Upon receiving that information, the post processing step then loads the command chain (including the header) into the work queue of the identified process, which, in present illustrative example, happens to be ts_disp.

The ts_disp preprocessing step responsive to finding the command chain and header in its associated work queue checks at entry 508 the identity of the data specified by the associated "%1" argument specified at entry 507 to ensure that the data has arrived at the correct process. If the ts_disp processing step finds that not to be the case, then it passes the command chain and header to a error handling process. Otherwise, the preprocessing step transfers to the ts_disp main processing step. The main processing step then (a) unloads the data from the DAM identified by the "o 4" argument associated with TS_ASYNC_REPLY, (b) stores the data (image fragment) in an associated display buffer and (e) releases the DAM, thereby completing the last leg of the data pipeline.

Thus, as described above, the data pipeline is dynamically and continuously maintained, in accord with an aspect of the invention, until all of the data fragments have been unloaded from the memory of node 400 and passed to the source process via the established data pipeline. In addition, each process in the chain exits releasing control over any input DAM that it may have allocated when it has completed its task in transporting the last fragment along the pipeline.

We turn now to a discussion of the hardware which implements nodes 200, 300 and 400.

Figure 7:
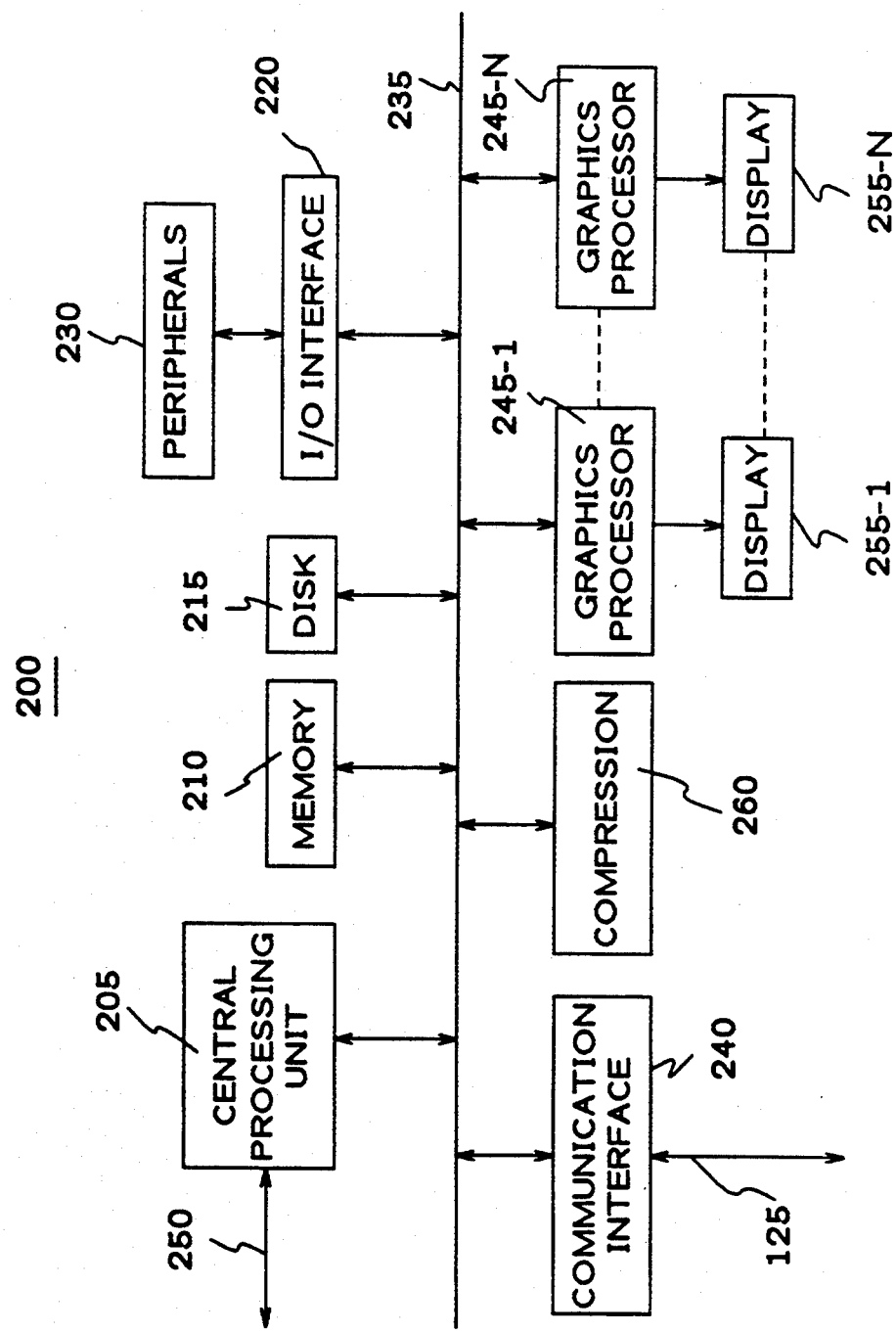
FIGS. 7-9 are broad blocks diagrams of the processors (nodes) depicted in FIG. 1, respectively.

Turning then to FIG. 7 there is shown a simplified block diagram of node 200. At the heart of node 200 is central processing unit 205 which provides, inter alia, system control, host processing and local memory management features. System control features include, for example, system clock generation, interrupt handling and bus arbitration. Central processor 205 communicates with its peripheral circuits via bus 235. These peripherals include memory 210 (e.g., RAM memory), hard disk 215, communication interface 240, compression/decompression circuit 260 and graphic processors 245-1 through 245-N. (The compression/decompression algorithm that implements circuit 260 is discussed below.) Central processor 205 also communicates with the peripherals collectively designated 230 via bus 235 and I/O interface 220. These other peripherals include, for example, a data entry terminal, maintenance port and printers. The design of bus 235 follows the well-known VMEbus standard. As mentioned above, central processor 205 communicates with user terminal (not shown in the FIG.) via bus 250.

Communication interface circuit 240 includes circuitry operative for connecting node 200 to another node, for example, either node 300 or node 400. Such circuitry includes a communication controller and modular network interface. The controller manages the bidirectional flow of data between the nodes in which the established communication path, or link, is a so-called half-duplex link employing the well-known HDLC frame format. The network interface provides the physical network connection in one of number of possible forms, such as, for example, optical fiber, V.35, T1, or RS-232C. The connection could also be, for example, a telephone line, as mentioned above.

Graphics processors 245-1 through 245-N each include a display processor and memory (not shown), such as so-called DRAM memory, for the storage of images that will ultimately be displayed on display monitors 255-1 through 255-N, respectively.

Figure 8:
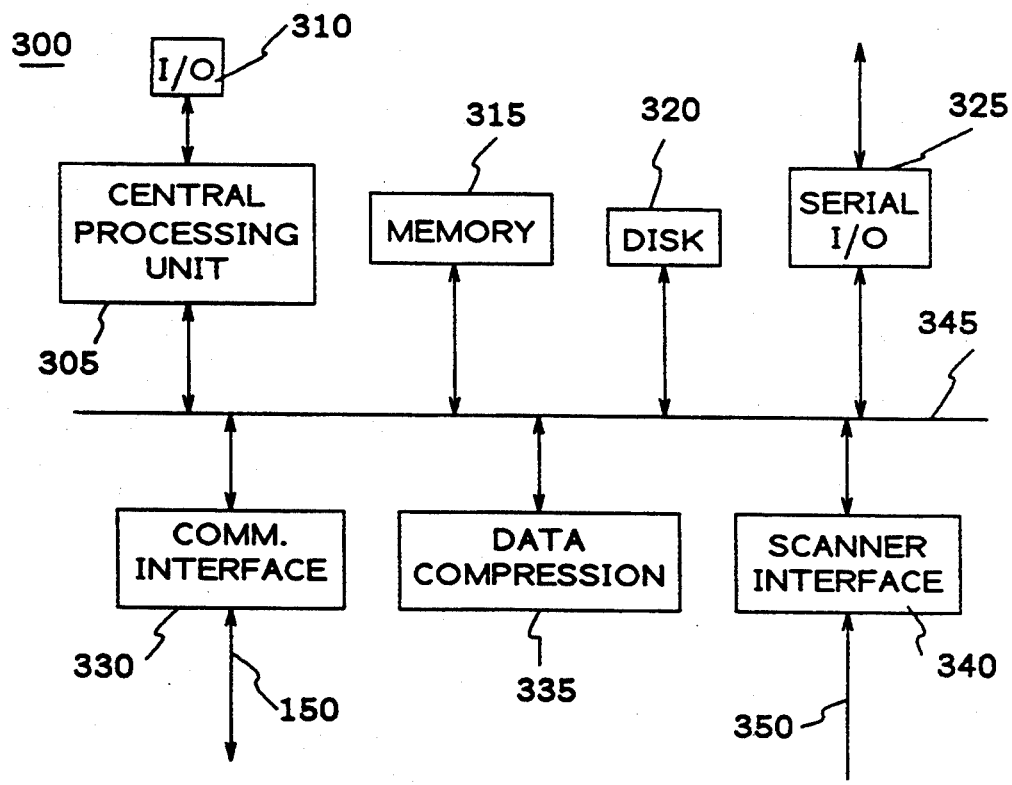

Similarly, node 300 also includes a central processing unit 305, as shown in FIG. 8. Like central processor 205, central processor 305 provides, inter alia, system control, host processing and local memory management features. Central processor 305 communicates with its peripherals via bus 345, which also follows the well-known VMEbus standard. These peripherals include memory 315, hard disk 320, communication interface 330 (discussed above) and data compression circuit 335 (discussed below). Central processor 305 also communicates with other peripherals via bus 345 and serial I/O port 325. These other peripherals (not shown) include a data terminal, maintenance terminal and printer as well as a user terminal for alerting central processor to incoming data via bus 350 and scanner 340. The data terminal is the source of other data (e.g. alphanumeric data, such as text) that node 200 acquires for storage in node 400, the path for storing such data being via communication interface and path 150, as mentioned above.

As mentioned above, node 200 may acquire data (images) via bus 350 and scanner 340, in which scanner 340 is a so-called frame grabber. That is, bus 350 connects to the output bus of an imaging device which is transmitting an image, or a series of images to another device, such as, for example, a display monitor. A user, communicating with central processor via I/O interface 310, may direct central processor 305 to acquire a copy of each such image and store the image in one of the other nodes, such as, for example, node 400. (Alternatively, the inputted request could direct that the image(s) be transmitted to node 200 for display on the display monitors contained in node 200.) Responsive to the request, central processor 305 activates scanner 340 which "grabs" a copy of the image via bus 350 and presents the image to bus 345 as each fragment of the image is being so acquired. Central processor 305, in turn, constructs a command chain which establishes a data pipeline between node 300 and node 400 via communication interface 330 and path 150, in which it is the processes identified in the command chain that establish the pipeline, in accord with the invention.

The request inputted by the user may include an instruction directing central processor 305 to compress the image data before the data is stored in node 400. In that instance, the command chain will include a TS_COMPRESS command which will cause the data outputted by scanner 340 to bus 345 to be presented to compression circuit 335 so that the data may be compressed before it is ultimately transmitted to node 400 via bus 345, communication interface circuit 330 and path 150. In our arrangement, compression of data is accomplished using a predetermined compression algorithm, such as, for example, an algorithm employing a differential pulse code modulation transform followed by the well-known Lempel-Ziv-Welch encoder. The inputted request may specify one of a number of compression quality factors, such as, for example, a quality factor associated with a ratio of approximately 2:1 for compression that is free of distortion.

It can be appreciated from the foregoing discussion that the command chain would include a number of other commands as well as appropriate options and arguments. For example, the chain would include, inter alia, the TS_SEND and TS_RECV commands for establishing communication path 150 as well as the TS_IMADDD command, which would cause the image to be stored in the memory of node 400. As before, the various processes would then dynamically and continuously maintain the data pipeline until the last fragment of the incoming image received via bus 350 is stored in node 400.

Figure 9:
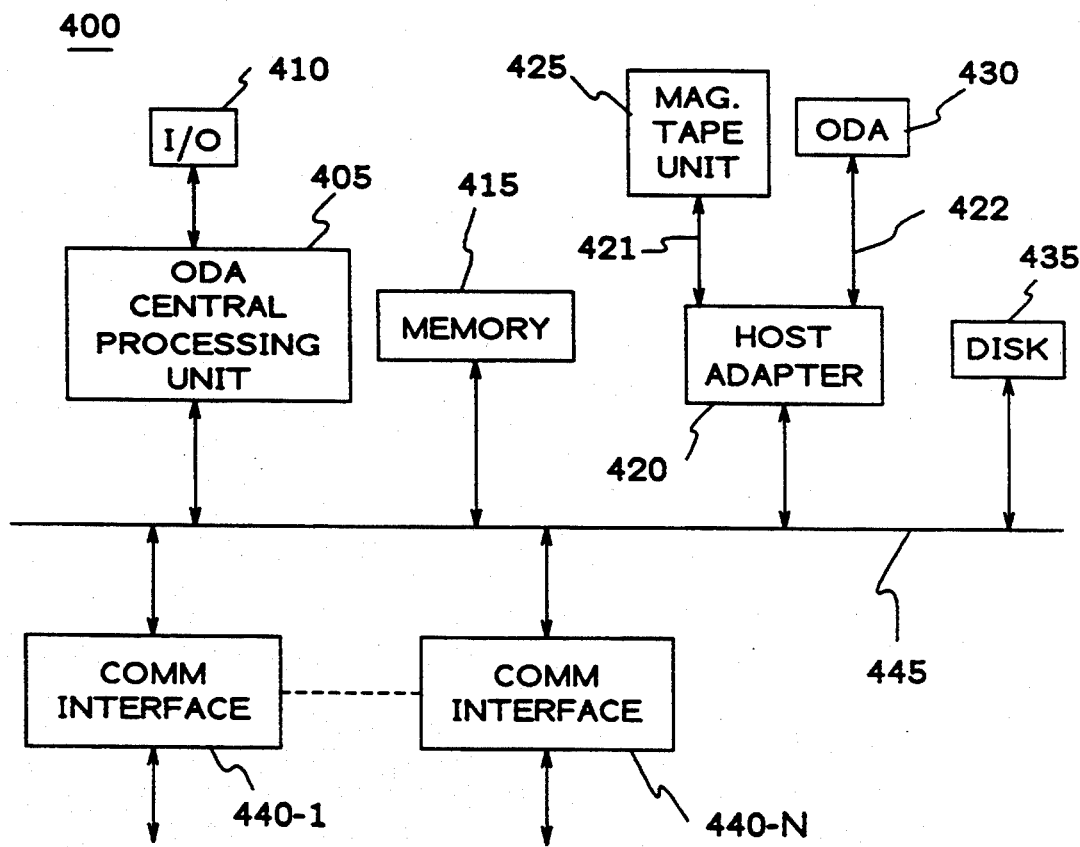

With that in mind, we now turn to FIG. 9 which illustrates a broad block diagram of node 400. Similarly, central processing unit 405 provides, inter alia, system control, host processing and data management features, as described above. The data management feature is the management of the data, i.e., text and/or graphics (images) that may be stored on either hard disk unit 435 or high capacity disk unit 430. Hard disk unit 435, which may be, for example, a so-called basic Winchester disk unit, is used for the storage of data that is current. When such data is no longer current, it is then "archived" on disk unit 430, which may be an optical disk arrangement (ODA) employing a number of optical disk platters configured in what is commonly referred to as a "jukebox" arrangement.

Central processor 405 communicates with its peripheral circuit via bus 445, which also follows the well-known VMEbus standard. Besides the aforementioned ODA 430 and disk unit 435, these peripherals include, inter alia, memory 415 (e.g. RAM memory), host adapter 420 and communication interface circuits 440-1 through 440-N. Central processor 405 may access either tape unit 425 or ODA 430 via bus 445 and host adapter 420. Host adapter 420 is arranged to interface bus 445 with busses 421 and 422, which are arranged in accordance with the well-known SASI bus standard.

Magnetic tape unit 425 is employed for the storage of software programs (processes) which implement the invention in node 400 and storage of diagnostic and maintenance procedures for node 400. It is also employed for the storage of a data index file that is associated with ODA 430.

The software which implements the invention in nodes 200, 300 and 400 consists of a software process which constructs a command chain using known routines identified in a library of routines (lib.a) and consists of software processes which then execute the commands to establish a data pipe line. Processes which execute respective commands thus provide a system resource, such as a data base resource, communications resource, or compression/decompression resource. Such processes are therefore referred to as resource processes. (Hereinafter, a process will also be referred to as "program".)

Turning now to FIG. 10, there is shown a flow chart of the software which constructs a command chain responsive to receipt of a request inputted by a user. In particular, the program is entered at block 1000 and proceeds to block 1001 to receive the inputted request. The inputted request implicitly determines which command chain is constructed (generated) based on which descriptors are contained in the input. For example, descriptors respectively identifying the source data, destination, options and parameters for the transfer of data from one node to another node. As mentioned above, the transfer of data via a data pipeline could also be local. For example, a data pipeline may be established totally within a node to transfer data from a local memory (e.g., disk memory 215 FIG. 7) to another device, such as a graphics processor (e.g., processor 245-1).

Upon receipt of the input, the program transfers to block 1002 where it constructs the respective command chain. An expanded version of block 1002 is illustrated in FIG. 11. Specifically, at block 1101, the command chain that is about to be constructed is classified as one of three types of command chains, namely, a local-to-local, remote-to-local or local-to-remote command chain. The program proceeds to block 1102 after it has classified the command chain. At block 1102, the program selects a possible table of commands from one of a number of such tables based on the classification of the command chain. The program then proceeds to block 1103 where it executes blocks 1104 through 1106 for each command in the table.

That is, at block 1104, the program selects from the table a command having options that match the options contained in the inputted request. The table also specifies the number and types of arguments that are needed to properly execute the selected command. Therefore, after selecting a command, the program proceeds to block 1105 where it enters (fills in) those arguments. The program then proceeds to block 1106. At block 1106, the program enters the selected command, options and associated arguments in the command chain that the program is constructing. The program then proceeds to block 1104 to select the next command and associated options and arguments that will be needed for the command chain. The program continues in the foregoing manner, i.e, executing block 1104 through 1106, until it has constructed the desired command chain. At that point, the program proceeds to block 1103 of FIG. 10. At block 1003, the program "posts" the command chain in the manner described above as means of initiating the building of the data pipeline. The program then exits via bock 1004.

A generalized version of the software which implements the invention in the various processes that will be invoked to establish a particular data pipeline is illustrated in FIGS. 12 through 15.

Figure 12:
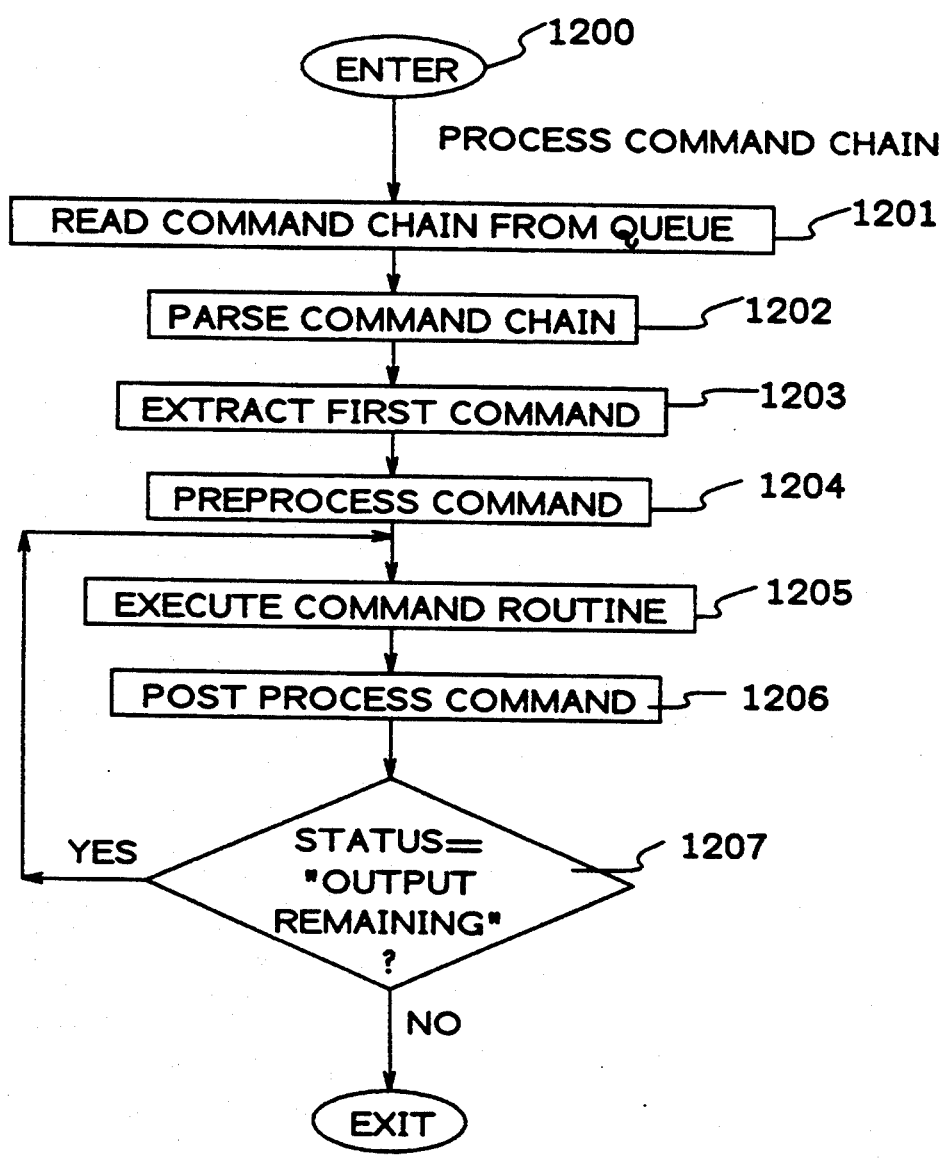
Figure 13:
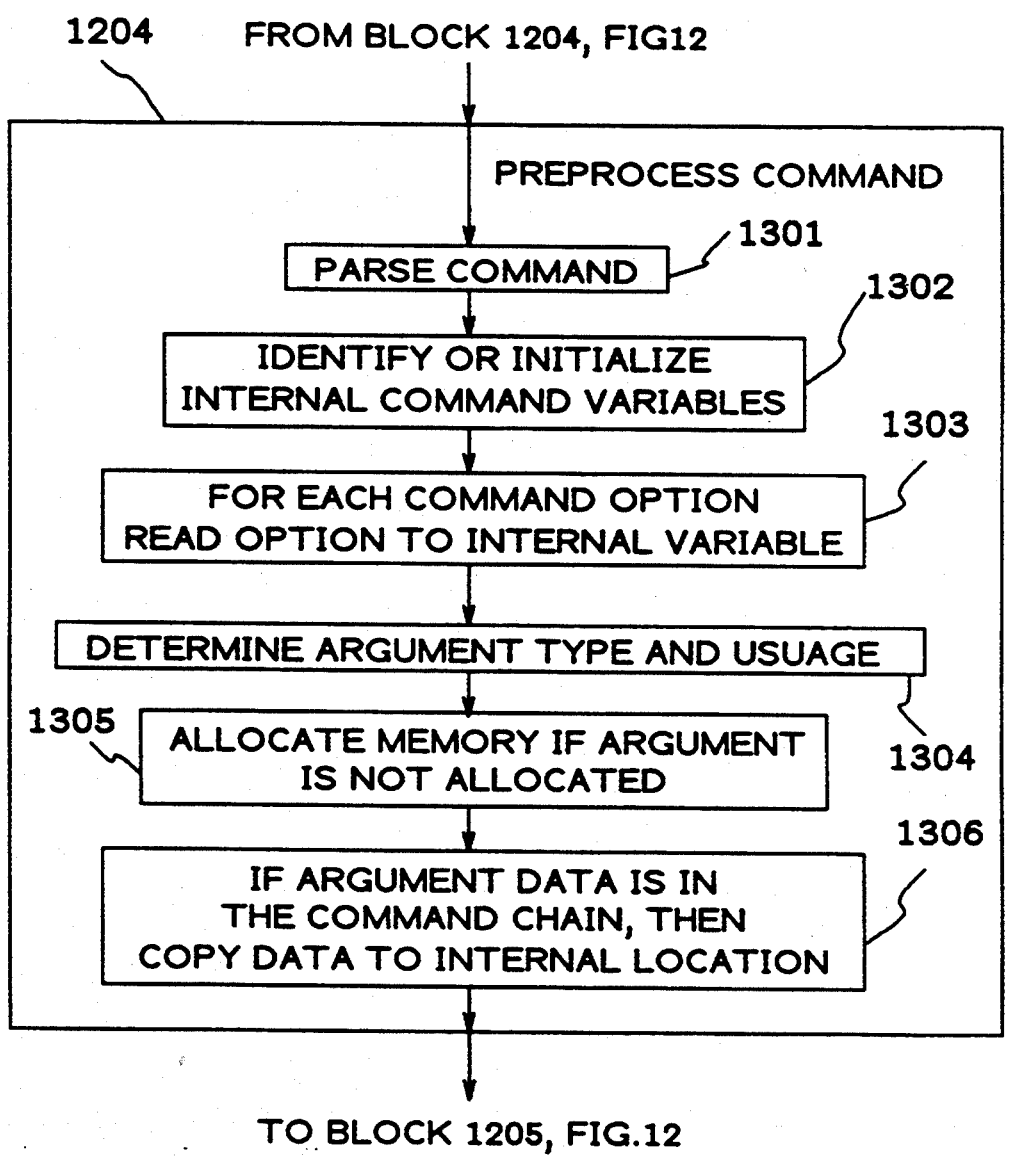

Turning then to FIG. 12, a program (process) providing a service arranged to execute a respective command of the chain (the command that is currently first in the chain) is entered via block 1200 where it proceeds to block 1201. At block 1201, the program checks its associated queue. If the program finds a command chain in the queue, then it proceeds to block 1202. Otherwise, the program waits until a message is placed in its queue. At block 1202, the command chain is parsed. That is, based upon the syntax of the command chain, the locations of the commands and arguments in the chain are identified so that they can easily be extracted. Once the command has been parsed, the program then proceeds to block 1203 where it unloads the first command from the chain and then proceeds to block 1204. At block 1204, the program prepares to invoke the respective service that will execute the command. As mentioned above, a service program comprises three steps (sections), namely, a preprocessing step, main step and post processing step. (It is noted that preprocess and post process steps are not actually part of the service routine, and are the same for all service routines controlled by a respective process. In this way, service routines may readily be added (or deleted) to a process without changing the preprocessing and post processing steps.) Accordingly, the preprocessing step is first to be entered, as represented by block 1204. As mentioned above, a preprocessing step performs initialization activities for the command and it associated arguments. An expanded version of block 1204 is illustrated in FIG. 13.

Specifically, at block 1301, the unloaded command is parsed into a command name, associated options and arguments, respectively. If the command represents the establishment of a data pipeline to obtain the first fragment of desired data, then the preprocessing step, at block 1302, (a) initializes variables internal to the respective service program and (b) sets the values of those variables to equal the values of respective ones of the options and arguments associated with the command being processed. If the command is not associated with the first fragment, then, at block 1303, the service program identifies and uses the values of existing variables. The service program then proceeds to block 1304.

Blocks 1304 through 1306 represent a looping program which processes each argument associated with the command being executed. Therefore, at block 1304, the service program identifies the type and usage (e.g., input or output DAM, or parameter) of the first of such arguments, in the manner described above, and then proceeds to block 1305. At block 1305, the service program allocates memory, for example, a DAM if (a) the DAM has not yet been allocated or (b) the first fragment of the desired data is being processed. The service program then proceeds to block 1306. At block 1306, the service program copies the argument data into the internal variables that were initialized at block 1302 if it finds that the argument it is processing is stored in the command chain. The service program then returns to block 1304 to process the next argument associated with the named command being executed. (It is noted that an input argument such as for example, a database key (TS_DBKEY) is the same for all fragments of the desired data. Such a parameter argument is only copied into an internal variable once, when the first fragment is processed.) Thereafter, the proprocessing step proceeds to block 1205 of FIG. 12 when it has completed preprocessing all of the arguments associated with the named command.

Figure 14:
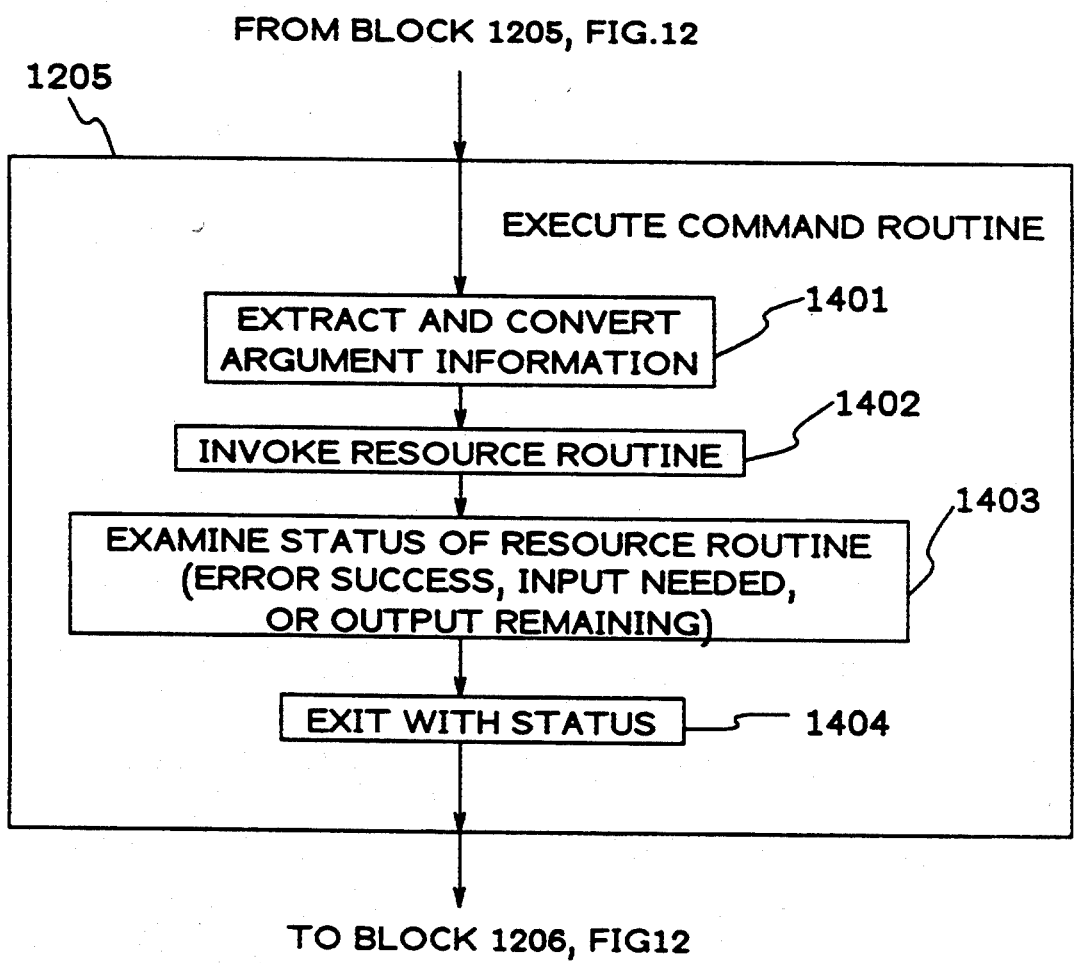

At block 1205, the process server enters the main step of the service program which is specific to the command being executed, such as a TS_IMREAD command. An expanded version of block 1205 is illustrated in FIG. 14.

Specifically, at block 1401, the respective command routine (e.g., TS_IMREAD) retrieves the arguments of the command being executed from the aforementioned internal variables and converts them into a form needed to invoke the main step of the service program, the main step being, for example, TS_IMREAD, TS_SEND, etc, as represented by block 1402. At block 1402 the main step of the service program performs its intended function in the manner described above, such as unloading a fragment of data from the memory contained in node 400 and storing the data in an allocated output DAM. The main step then exits by transferring to block 1403, which places the flow of the program back into the general calling routine contained in the software of the process (e.g., ts_dbserver).

At block 1403, the program examines the status of the service program executed at block 1402 to determine if the latter program successfully completed its intended function. That is, the status is converted into one of—illustratively four values—, which is used to signifying the next course of action that is to be taken in the pipeline flow of data.

The four values identify respectively: (a) an "error" condition indicating that the command was not successfully executed, as discussed above; (b) a "success" condition indicating that the command was successfully executed and no output is remaining; (c) an "input needed" condition indicating that the command is waiting for additional input before it can generate an output, which occurs when, for example, input data is being compressed and more than one input DAM may be needed to "fill up" one output DAM, and (d) an "output remaining" condition indicating that the input is being processed and there is currently output to send to the next command in the pipeline, which occurs, for example, when an input DAM of compressed data is being decompressed (expanded) and the output DAM is full and in the input DAM still contains compressed data. It is noted that in the case of the "success" routine, the associated process terminates its portion of the data pipeline if the last fragment of the desired data is being processed. Following the foregoing, the process then proceeds to block 1404, where it exits with the value of the status acquired at block 1403 and proceeds to block 1206 of FIG. 12.

Figure 15:
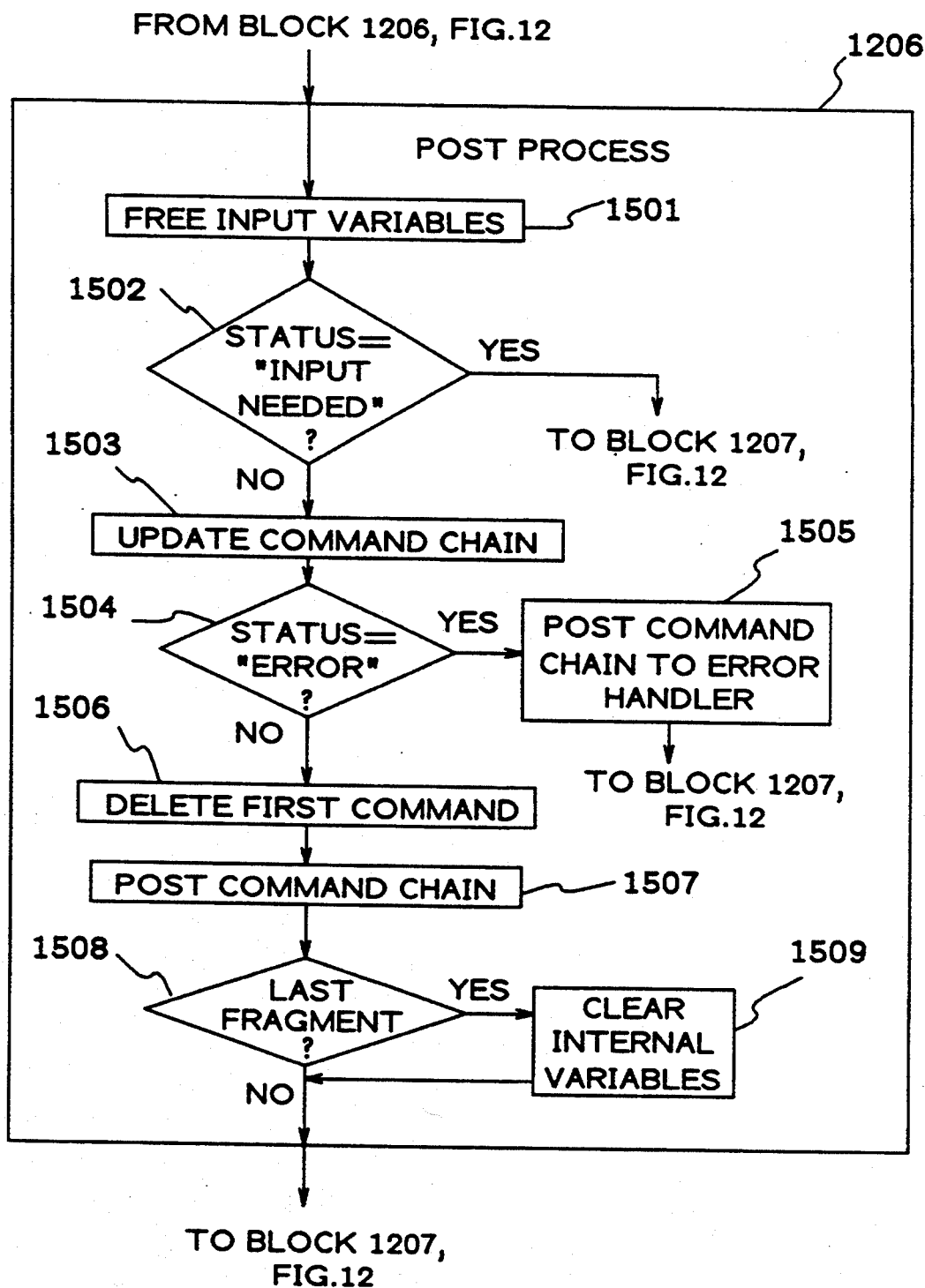

At block 1206, the aforementioned post processing step is entered to process the status value. An expanded version of block 1206 is illustrated in FIG. 15. At block 1501 the post processing step "frees up" the input variables and then proceeds to block 1502 where it checks the value of the status to see if the value is indicative of an "input needed" condition. The post processing step proceeds to block 1207 of FIG. 12 if it finds that to be the case. Otherwise, it proceeds to block 1503.

At block 1503, the post processing step updates the command chain by copying from the internal command variables back into the command chain, all options, status and argument data which may have changed during the execution of the command. The post processing step then proceeds to block 1504 where it checks the value of the status to see if the value is indicative of an "error" condition, and proceeds to block 1505 if it finds that to be the case. Otherwise, the post processing step proceeds to block 1506.

At block 1505, the post processing step posts the command chain to an error handling program (routine). The error handling routine then processes the command chain in the manner discussed above.

At block 1506, the post processing step deletes the first command from the command chain and then proceeds to block 1507 where it "posts" the command in the manner described above. The post processing step then proceeds to block 1508 where it checks to see if the fragment of data that had just been processed is the last fragment of the desired data. The post processing step proceeds to block 1509 if it finds that to be the case. Otherwise, it proceed to block 1207 of FIG. 12. At block 1509, the post processing step clears the input variables as a means of terminating its portions of the data pipeline and then proceeds to block 1207 of FIG. 12.

At block 1207, the post processing step checks the value of the status to see if the value is indicative of the "output remaining" condition. If the post processing step finds that to be the case, then it proceeds to block 1205 to process the remaining output as described above. Otherwise, the post processing step exits having no further work to perform at this juncture.

The foregoing is merely illustrative of the principles of our invention. Those skilled in the art will be able to devise numerous arrangements, which although not explicitly shown or described herein, nevertheless, embody those principles that are within the spirit and scope of the invention.

We claim:

1. An arrangement for establishing a data pipeline between first and second electronic processors, said arrangement comprising first means in said first processor, responsive to receipt of a request identifying particular data associated with said second processor, for dynamically constructing a sequence of commands including commands operative for establishing first and second communications paths forming said data pipeline, second means in said first processor, responsive to a first one of said commands, for causing said first processor to establish said first communications path from said first processor to said second processor, and, responsive to establishing said first communications path, for deleting said first one of said commands from said sequence to form a remainder sequence of commands and for passing the remainder sequence to said second processor via said first communications path, and means in said second processor for receiving said remainder sequence via said first communications path, and for executing ones of said commands in the order that they are contained in said received remainder sequence, said ones of said commands respectively causing said means in said second processor to unload said data from a memory associated with said second processor, establish said second communications path from said second processor to said first processor, and pass said data via said second communications path to said first processor.

2. The arrangement set forth in claim 1 wherein said data comprises a plurality of fragments of data, wherein said second processor retains a copy of said received remainder sequence and wherein said means in said second processor includes means, responsive to particular options associated with individual ones of said ones of said commands, for repeatedly executing said individual ones of said commands in order to unload respective ones of said fragments of data from said memory and pass each such fragment to said first processor via said second communications path.

3. The arrangement set forth in claim 1 wherein said second processor further includes means, responsive to said received remainder sequence containing a first command, for terminating said first communications path, and for then deleting said first command from said remainder sequence.

4. The arrangement set forth in claim 2 wherein said second processor further includes means, responsive to said remainder sequence containing at least one command operative for terminating said second communications path and responsive to the last of said fragments being passed to said first processor, for terminating said second communications path.

5. The arrangement set forth in claim 1 wherein said first and second communications paths are respective telephone line connections.

6. An arrangement for establishing a data pipeline between a source of particular data and a recipient of said data, said recipient and said source being associated with first and second electronic processors, respectively, said data pipeline being formed from first and second communications paths, said arrangement comprising first means in said first processor, responsive to receipt of a request requesting said data, for dynamically constructing a series of commands operative for respectively controlling the operation of said first and second processors in order to deliver said data to said recipient, second means in said first processor, responsive to a first one of said series of commands, for establishing said first communications path from said first processor to said second processor, for deleting said first command from said series to form a resulting series and for passing the resulting series to said second processor via said first communications path, first means in said second processor responsive to receipt of said resulting series, for executing ones of said commands in the order that they are contained in said resulting series, and second means in said second processor, responsive to the execution of each of said ones of said commands, for unloading said data from a memory contained in said second processor, for establishing said second communications path from said second processor to said first processor and for passing said data to said first processor for delivery to said recipient.

7. The arrangement set forth in claim 6 wherein said particular data comprises a plurality of fragments of data and wherein said second means in said second processor includes means, responsive to particular options associated with said ones of said commands for repeatedly executing said ones of said commands in accordance with said options in order to unload respective ones of said fragments of data from said memory and pass each such fragment to said first processor via said second communications path.

8. The arrangement set forth in claim 6 wherein said first means in said second processor includes means, operative responsive to a command positioned first in said received resulting series, for terminating said first communications path and deleting the first command from said resulting series so that other ones of said ones of said commands may be executed.

9. The arrangement set forth in claim 6 wherein said first and second communications paths are respective telephone line connections.

10. The arrangement set forth in claim 6 wherein said second means in said second processor includes means, responsive to the execution of each of said ones of said commands, for deleting said ones of said commands from said resulting series as they are executed and for then executing the command that is positioned first in said series following each such deletion.

11. A method of establishing a data pipeline between a source of data and a recipient of said data, said recipient and said source being associated with first and second electronic processors, respectively, said method comprising the steps of at said first processor, responding to receipt of a request requesting particular data by dynamically constructing a series of commands identifying respective processes, at said first processor, invoking a first one of said processes, in which said first one of said processes includes the steps of (a) establishing a first communications path from said first processor to said second processor, (b) deleting the identity of said first process from said series to form a resulting series and (c) passing the resulting series to said second processor via said first communications path, and at said second processor, responding to receipt of said resulting series by invoking ones of said processes in the order that they are identified in said resulting series, said ones of said processes respectively performing the steps of (d) unloading said data from memory associated with said second processor, (e) establishing said data pipeline by establishing a second communications path from said second processor to said first processor and (f) passing said data to said first processor via said second communications path for delivery to said recipient.

* * * * *